UNITED STATES PATENT OFFICE.

HENRY SPENCER BLACKMORE, OF MOUNT VERNON, NEW YORK, ASSIGNOR TO ROBERT E. ROBINSON AND DANIEL C. SPRUANCE, TRUSTEES, OF NEW YORK, N. Y.

PROCESS OF MAKING NITRIC OR OTHER OXYNITROGEN ACID AND METAL PEROXID.

982,466.     Specification of Letters Patent.     Patented Jan. 24, 1911.

No Drawing.     Application filed November 5, 1908. Serial No. 461,214.

*To all whom it may concern:*

Be it known that I, HENRY SPENCER BLACKMORE, a citizen of the United States, residing at Mount Vernon, in the county of Westchester and State of New York, have invented certain new and useful Improvements in Processes of Making Nitric or other Oxynitrogen Acid and Metal Peroxid, of which the following is a specification.

The object of this invention broadly is to produce acids and peroxids from salts, and consists in transforming said salts by the action of heat, steam, and oxygen either *per se*, or of a substance containing it, either in a combined or associated condition, capable of delivering or yielding the same to the element, compound, or composition to be peroxidized.

Specifically the invention relates to the production of nitrogen acids such as nitric acid, from nitrogen acid salts, such as nitrates, and the recovery of the base of nitrogen acid salt, as a peroxid; the specific illustration here given of the process being that of transforming barium nitrate into nitric acid and barium peroxid.

I take for example dried barium nitrate, preferably such as has been produced by the process described and claimed in U. S. application, Serial No. 450,007, filed August 24, 1908, which consists specifically in oxidizing nitrogen of a nitrogen oxid by the combined action of oxid and peroxid of hydrogen, and neutralizing the acid so formed with barium peroxid, forming barium nitrate solution, after recovering the barium nitrate by evaporation and drying, but not limited to such as any barium nitrate is applicable, and place the barium nitrate in a suitable receptacle, the nitrate being broken up in small pieces, *i. e.*, about one-quarter inch cubes, representing in aggregate a very coarse granulation; the object being to present a mass of more or less porous nature or character by the interstices between the particles of the nitrate, to admit of the passage of the gaseous or vaporous reacting agents, and to expose as large a surface as possible of the nitrate to the action thereof, and admit of internal heating throughout the mass by heat conveyed therein through the medium of the fluid, gaseous or vaporous, substance passing therethrough. The barium nitrate thus prepared having been placed in a closed receptacle is heated gradually but not to a sufficiently high degree to admit of its melting or fusion, after which superheated steam at a temperature of about 800° centigrade is introduced. The superheated steam passes rapidly through the porous mass of barium nitrate dissociating it into barium oxid and hydroxid and producing nitric acid which passes along with the steam and is finally condensed therewith, forming more or less dilute acid, the rapidity of the passage of the steam through the nitrate takes up the nitrogen oxid as nitric acid and prevents its breaking up into lower nitrogen oxid of less comparative value and the heat carried into the mass by the steam serves to elevate the temperature of the nitrate to a transforming temperature within and throughout the mass without elevating it to a temperature at which the residue fuses, and thus leaves the same in a dry and porous condition. It should be noted that the high temperature of the steam is no indicator of the temperature of the solid mass in the receptacle as the steam only delivers a part of its heat to the solid in immediate juxtaposition with it, during its passage through the interstices between the particles, during the decomposition of the nitrate into nitric acid and barium oxid and hydroxid, the excess of heat being carried out of the receptacle with excess of steam. The nitric acid is finally recovered upon condensation of the steam leaving a mixture of barium oxid and hydroxid in the receptacle.

During the passage of the superheated steam through the mass of the nitrate to the completion of its decomposition and separation of the nitric acid, it assumes a temperature of about 600° centigrade. The steam is still continued for the purpose of maintaining the temperature between 500° and 600° centigrade and air or oxygen passed through the mass together with it, whereupon the barium oxid and hydroxid is converted into barium peroxid or dioxid which, upon cooling, may be withdrawn from the receptacle. This product may then be employed in the making of nitric acid and nitrates from nitrogen and its oxids as set forth in application Serial No. 450,007, before noted.

The reactions which take place in the making of the nitric acid and forming peroxid, afore described, may be illustrated by the following chemical formula or equation:

Making nitric acid:

Making barium peroxid:

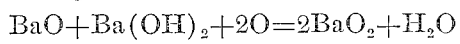

The steam not only acts as a chemical agent to form and release the nitric acid but also as a physical heating agent to convey heat in the interior of the mass. Any other superheated fluid inert to the ingredients may be associated with or employed *per se* together with the oxygen, or oxygen delivering or yielding substance, to peroxidize the barium in the last stage of the process, for the purpose of maintaining interior heat therein.

Any other nitric acid or nitrogen acid salt of metal, such as mercury, lead, etc., may be substituted for barium nitrate provided the base is capable of taking on oxygen to form peroxid directly from oxygen *per se* or from substances capable of yielding or delivering the same.

In the treatment of the nitrate with steam and oxygen, air, or other oxygen yielding substance, the steam and oxygen may be supplied simultaneously or alternately without departing from the spirit of my invention. Nitrous acid may also be produced by similar treatment of nitrites. Other acids than nitrogen or nitric acids such as hydrochloric, hydrofluoric, etc., may also be produced from salts of other acids, and peroxids of the bases thereof likewise produced. The present invention is not limited to the production of nitric acid and barium peroxid by the combined action of steam and oxygen, but the above illustration is given only as an example of the performance and operation of the process.

While subjecting the barium salt to the combined action of steam and oxygen I prefer to expose the same to superatmospheric pressure for the reason that it facilitates the dissociation or decomposition of the barium salt and the formation of the corresponding acid while at the same time it assists to a large degree in inducing the union of oxygen with the base of the salt being acted upon in the formation of super or peroxidized products.

Having now described my invention what I claim as new and desire to secure by Letters Patent is:

1. The process of making nitric acid and barium peroxid, which consists in exposing barium nitrate to the action of steam, oxygen and heat.

2. The process of making nitric acid and barium peroxid, which consists in exposing barium nitrate to the action of steam, oxygen and heat while under superatmospheric pressure.

3. The process of making nitric acid and barium peroxid, which consists in exposing barium nitrate to the combined and simultaneous action of steam, oxygen and heat.

4. The process of making nitric acid and barium peroxid, which consists in exposing barium nitrate to the combined and simultaneous action of steam, oxygen and heat while maintained under superatmospheric pressure.

5. The process of making nitric acid and barium peroxid, which consists in exposing barium nitrate to the action of superheated steam and oxygen.

6. The process of making nitric acid and barium peroxid, which consists in exposing barium nitrate to the combined and simultaneous action of superheated steam and oxygen.

7. The process of making nitric acid and barium peroxid, which consists in exposing barium nitrate to the action of superheated steam and oxygen while under superatmospheric pressure.

8. The process of making nitric acid and barium peroxid, which consists in exposing barium nitrate to the combined and simultaneous action of superheated steam and oxygen while under superatmospheric pressure.

9. The process of making nitric acid and barium peroxid, which consists in heating barium nitrate by heat conveyed into the mass by the action of heated fluid and exposing said heated salt to the action of steam and oxygen.

10. The process of making nitric acid and barium peroxid, which consists in heating barium nitrate by heat conveyed into the mass by the action of heated fluid and exposing the said heated salt to the action of steam and oxygen while under superatmospheric pressure.

11. The process of making nitric acid and barium peroxid, which consists in heating barium nitrate by heat conveyed into the mass by the action of heated fluids and exposing the said heated salt to the combined and simultaneous action of steam and oxygen.

12. The process of making nitric acid and barium peroxid, which consists in heating barium nitrate by heat conveyed into the mass by the action of heated fluids and exposing the said heated salt to the combined and simultaneous action of steam and oxygen while under superatmospheric pressure.

13. The process of making barium peroxid, which consists in exposing a barium salt, decomposable by steam to the combined action of steam and oxygen.

14. The process of making barium peroxid, which consists in exposing a barium salt, decomposable by steam to the combined and simultaneous action of steam and oxygen.

15. The process of making barium peroxid, which consists in exposing a barium salt, decomposable by steam to the combined action of steam and oxygen, while under superatmospheric pressure.

16. The process of making barium peroxid, which consists in exposing a barium salt, decomposable by steam to the combined and simultaneous action of steam and oxygen, while under superatmospheric pressure.

17. The process of making barium peroxid, which consists in exposing a barium salt, decomposable by steam to the combined action of steam and air.

18. The process of making barium peroxid, which consists in exposing a barium salt, decomposable by steam to the combined and simultaneous action of steam and air.

19. The process of making barium peroxid, which consists in exposing a barium salt, decomposable by steam to the combined action of steam and air, while under superatmospheric pressure.

20. The process of making barium peroxid, which consists in exposing a barium salt, decomposable by steam to the combined and simultaneous action of steam and air, while under superatmospheric pressure.

In testimony whereof I affix my signature in presence of two witnesses.

HENRY SPENCER BLACKMORE.

Witnesses:
H. N. JENKINS,
WM. D. LEISSLER, Jr.